United States Patent
Su et al.

(10) Patent No.: US 8,239,651 B2
(45) Date of Patent: Aug. 7, 2012

(54) PORTABLE STORAGE DEVICE AND METHOD FOR INDICATING STORAGE CAPACITY

(75) Inventors: Hong-Ti Su, Taipei Hsien (TW); Peng-Yu Chen, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 116 days.

(21) Appl. No.: 12/891,765

(22) Filed: Sep. 27, 2010

(65) Prior Publication Data
US 2011/0214761 A1 Sep. 8, 2011

(30) Foreign Application Priority Data
Mar. 2, 2010 (CN) .......................... 2010 1 0116058

(51) Int. Cl.
*G06F 12/00* (2006.01)
(52) U.S. Cl. ............ 711/170; 711/4; 711/111; 711/156; 711/221; 137/551
(58) Field of Classification Search .................. 711/170, 711/4, 111, 156, 221; 137/551
See application file for complete search history.

(56) References Cited

U.S. PATENT DOCUMENTS

| | | | | |
|---|---|---|---|---|
| 5,237,689 A * | 8/1993 | Behnke | ............................ | 713/1 |
| 7,302,537 B2 * | 11/2007 | Kreiner et al. | ................. | 711/162 |
| 2002/0174286 A1 * | 11/2002 | Tamura | ............................ | 711/4 |
| 2005/0125566 A1 * | 6/2005 | Szolyga et al. | .................... | 710/1 |
| 2005/0246642 A1 * | 11/2005 | Valderas et al. | ................ | 715/730 |
| 2011/0066808 A1 * | 3/2011 | Flynn et al. | ................... | 711/118 |

* cited by examiner

*Primary Examiner* — Stephen Elmore
(74) *Attorney, Agent, or Firm* — Altis Law Group, Inc.

(57) ABSTRACT

A method for indicating storage capacity is applied in a storage device. The storage device includes a main storage unit, a capacity indicator, a driver, and a secondary storage unit. The second storage unit stores a preset storage capacity value and a drive table recording relationship between storage capacity difference ranges and rotation angles of the driver. The method includes: periodically obtaining a storage capacity value from a computer connected to the storage device; computing a difference between the obtained storage capacity value and the preset storage capacity value; determining the storage capacity difference range the difference falls within and the rotation angle the determined storage capacity difference range corresponds to in the drive table; and controlling the driver to rotate the determined rotation angle to drive the capacity indicator to indicate the obtained storage capacity value. A related storage device is also provided.

13 Claims, 3 Drawing Sheets

PORTABLE STORAGE DEVICE AND METHOD FOR INDICATING STORAGE CAPACITY

BACKGROUND

1. Technical Field

The present disclosure relates to storage devices and, particularly, to a portable storage device and a method for indicating storage capacity of the portable storage device.

2. Description of Related Art

Commonly, if a user wants to know available or used storage capacity of a portable storage device, he or she often connects the portable storage device to a computer to get the current storage capacity. However, after a period of time, the user may forget the storage capacity, and has to use a computer again to get the storage capacity, which is troublesome. Attaching a label on a portable storage device to indicate storage capacity may solve the problem. However, the labels may easily fall off from the storage device.

BRIEF DESCRIPTION OF THE DRAWINGS

The components of the drawings are not necessarily drawn to scale, the emphasis instead being placed upon clearly illustrating the principles of a portable storage device and a method for indicating storage capacity. Moreover, in the drawings, like reference numerals designate corresponding parts throughout several views.

DETAILED DESCRIPTION

Figure 1:
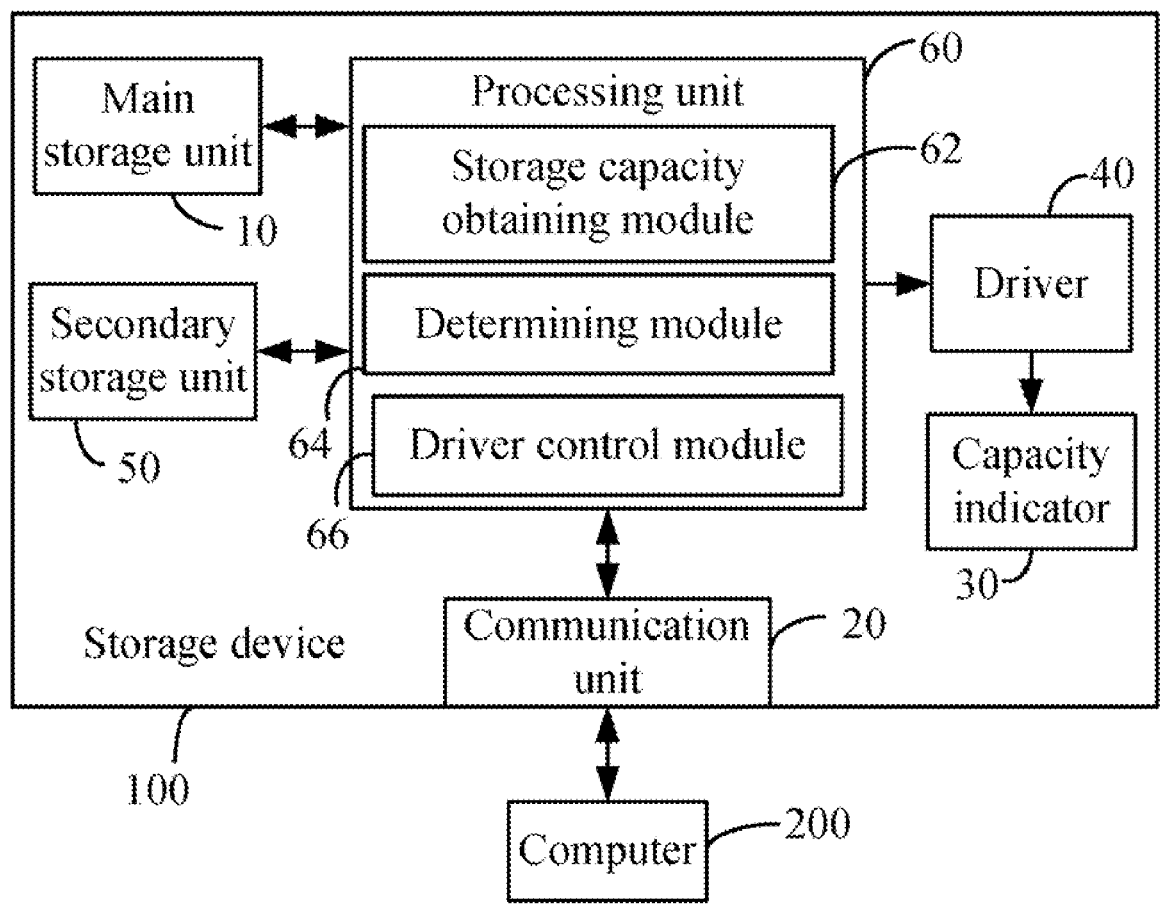
FIG. 1 is a block diagram of a portable storage device in accordance with an exemplary embodiment.

Referring to FIG. 1, an embodiment of a portable storage device 100 is illustrated. The device 100 includes a main storage unit 10 and a communication unit 20. The main storage unit 10 stores data, such as images, videos, and the like. The device 100 is connected to a computer 200 through the communication unit 20. The communication unit 20 may be a universal serial bus (USB) port, a BLUETOOTH unit, an infrared unit, or the like.

The device 100 further includes a capacity indicator 30, a driver 40, and a secondary storage unit 50. The capacity indicator 30 is configured to indicate a current storage capacity value of the main storage unit 10. In this embodiment, the current storage capacity value is the current available storage capacity value. In an alternative embodiment, the current storage capacity value is the current used storage capacity value. The driver 40 is configured to drive the capacity indicator 30 to indicate the current storage capacity value.

The secondary storage unit 50 stores a preset storage capacity value and a drive table recording relationship between storage capacity difference ranges and rotation angles of the driver 40. As described below, in the drive table, each storage capacity difference range corresponds to one rotation angle. In this embodiment, the preset storage capacity value is the current available storage capacity value of the main storage unit 10. In an alternative embodiment, the preset storage capacity value is the current used storage capacity value of the main storage unit 10. When the storage capacity of the main storage unit 10 is changed, the preset storage capacity value is correspondingly updated. Therefore, the preset storage capacity value always represents the current available or used storage capacity value of the main storage unit 10.

| Drive Table | |
|---|---|
| Storage capacity difference range | Rotation angle |
| 0 G~0.2 G | 1 degrees |
| 0.2 G~0.4 G | 2 degrees |
| ... | ... |

The device 100 further includes a processing unit 60. The processing unit 60 includes a storage capacity obtaining module 62, a determining module 64, and a driver control module 66.

The storage capacity obtaining module 62 is configured to periodically obtain a current storage capacity value of the main storage unit 10 from the computer 200 when the device 100 is connected to the computer 200.

The determining module 64 is configured to determine a difference between the obtained storage capacity value and the preset storage capacity value. If the difference is greater than zero, the determining module 64 determines the storage capacity difference range the difference falls within and the rotation angle the determined storage capacity difference range corresponds to in the drive table, and replaces the preset storage capacity value with the obtained storage capacity value. In this embodiment, a difference falling within one storage capacity difference range includes that the difference is equal to the upper threshold of the storage capacity difference range.

The driver control module 66 is configured to control the driver 40 to rotate the determined rotation angle in clockwise or counterclockwise direction to drive the capacity indicator 30 to indicate the obtained storage capacity value.

Figure 2:
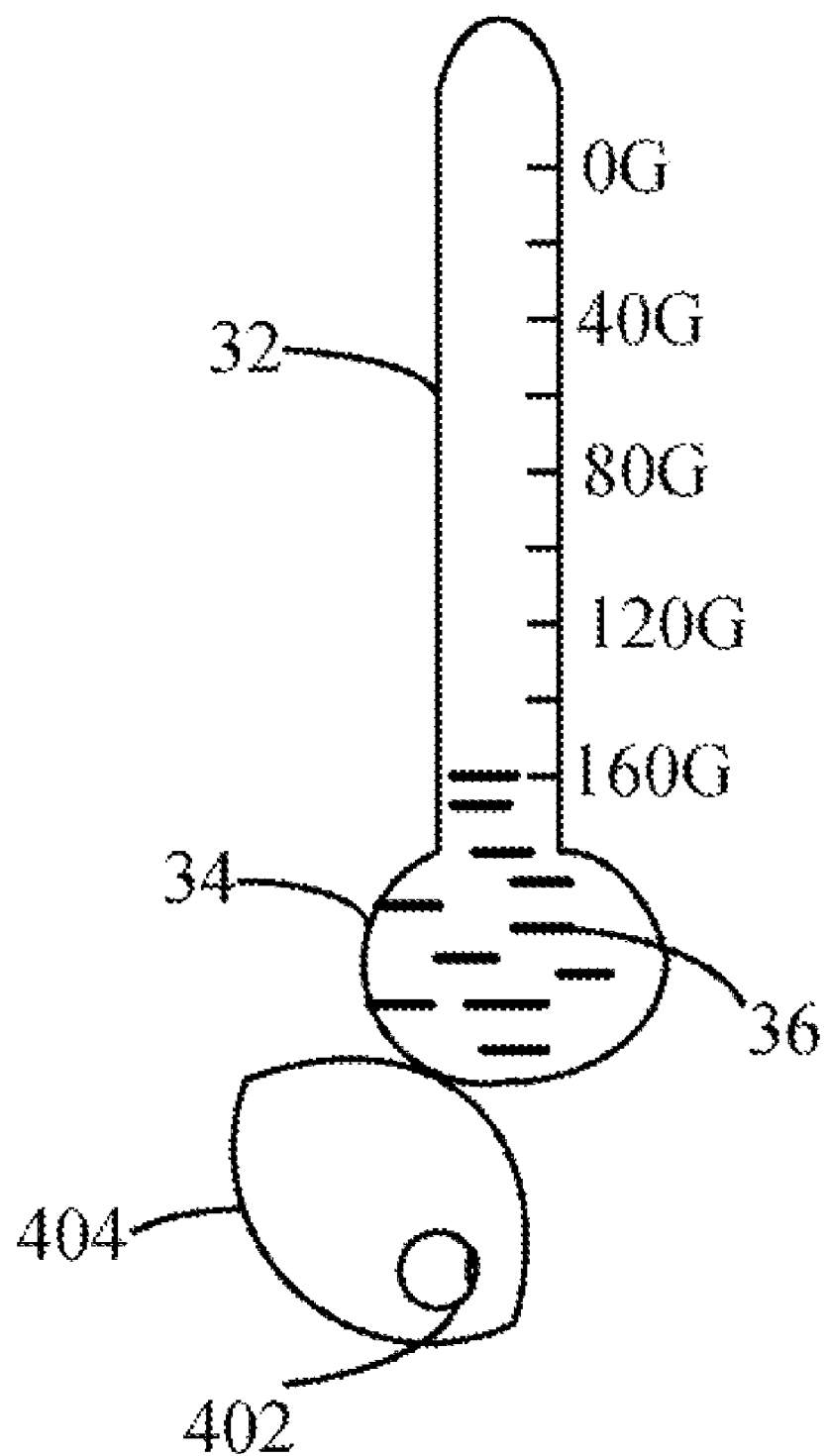
FIG. 2 is a schematic view of a driver and a capacity indicator of the portable storage device of FIG. 1.

Referring to FIG. 2, in this embodiment, the capacity indicator 30 includes a transparent glass tube 32, an elastic capsule 34, and colored liquid 36. The tube 32 and the capsule 34 cooperatively form an enclosed space to receive the liquid 36. The tube 32 defines a storage capacity graduation on its surface. The driver 40 includes a motor 402 and a cam 404 connected to the motor 402. The motor 402 may be a servo motor. The motor 402 can drive the cam 404 to rotate. The rotation of the cam 42 can contract the capsule 34, which causes the liquid 36 to flow in the enclosed space. The graduation value aligned with the liquid 36 thus changes, that is, the storage capacity value indicated by the capacity indicator 30 changes.

In this embodiment, the graduation values gradually increase from a top of the tube 32 to the capsule 34, and the graduation values represent different available storage capacity values of the main storage unit 10. Initially, the main storage unit 10 has the greatest available storage capacity, the capsule 34 is in a normal state, and the liquid 36 is aligned with the graduation value representing the greatest available storage capacity. If the device 100 is connected to the computer 200, and some data is stored in the main storage unit 10, the available storage capacity of the main storage unit 10 correspondingly decreases, and the obtained available storage capacity value is less than the preset storage capacity value. The determining module 64 then determines the rotation angle corresponding to the obtained available storage capacity value and replaces the preset storage capacity value with the obtained storage capacity value. The driver control module 66 controls the motor 402 to rotate the cam 404 the determined rotation angle clockwise. The rotation of the cam 404 contracts the capsule 34, causing the liquid 36 to rise to a position aligned with the graduation value representing the obtained available storage capacity value. Correspondingly, if some data is deleted from the main storage unit 10, the obtained available storage capacity value is greater than the preset storage capacity value. The driver control module 66 then controls the motor 402 to rotate the cam 404 the rotation angle corresponding to the obtained available storage capacity value counterclockwise, causing the liquid 36 to drop to a position aligned with the graduation value representing the obtained available storage capacity value.

In an alternative embodiment, the graduation values gradually increase from a top of the tube 32 to the capsule 34, and the graduation values represent different used storage capacity values of the main storage unit 10. Initially, the main storage unit 10 has the least used storage capacity, the capsule 34 is in the normal state, and the liquid 36 is aligned with the graduation value representing the least used storage capacity. If the device 100 is connected to the computer 200, and some data is stored in the main storage unit 10, the used storage capacity of the main storage unit 10 increases, and the obtained used storage capacity value is greater than the preset storage capacity value. The determining module 64 then determines the rotation angle corresponding to the obtained used storage capacity value and replaces the preset storage capacity value with the obtained used storage capacity value. The driver control module 66 controls the motor 402 to rotate the cam 404 the determined rotation angle clockwise. The rotation of the cam 404 contracts the capsule 34, causing the liquid 36 to rise to a position aligned with the graduation value representing the obtained used storage capacity value. Correspondingly, if some data is deleted from the main storage unit 10, the used available storage capacity value is less than the preset storage capacity value, the driver control module 66 controls the motor 402 to rotate the cam 404 the rotation angle corresponding to the obtained used storage capacity value counterclockwise, causing the liquid 36 to drop to a position aligned with the graduation value representing the obtained used storage capacity value.

In an another alternative embodiment, the graduation values gradually decrease from a top of the tube 32 to the capsule 34, and the graduation values represent different available or used storage capacity values of the main storage unit 10. Initially, the capsule 34 is in a contracted state, causing the liquid 36 to be aligned with the graduation value representing the greatest available or the least used storage capacity. When the device 100 is connected to the computer 200, and some data is stored in the main storage unit 10, the capsule 34 is less contracted, and the liquid 36 drops to a position aligned with the graduation value represent the current available or used storage capacity.

In this embodiment, when the device 100 and the computer 200 are disconnected, the cam 404 keeps in a position where the cam 404 contracts the capsule 34 to cause the liquid 36 to stay in a position aligned with the graduation value representing the current storage capacity value. Therefore, a user can know storage capacity of the device 100 through viewing the liquid 36 being aligned with which of the graduation values.

Figure 3:
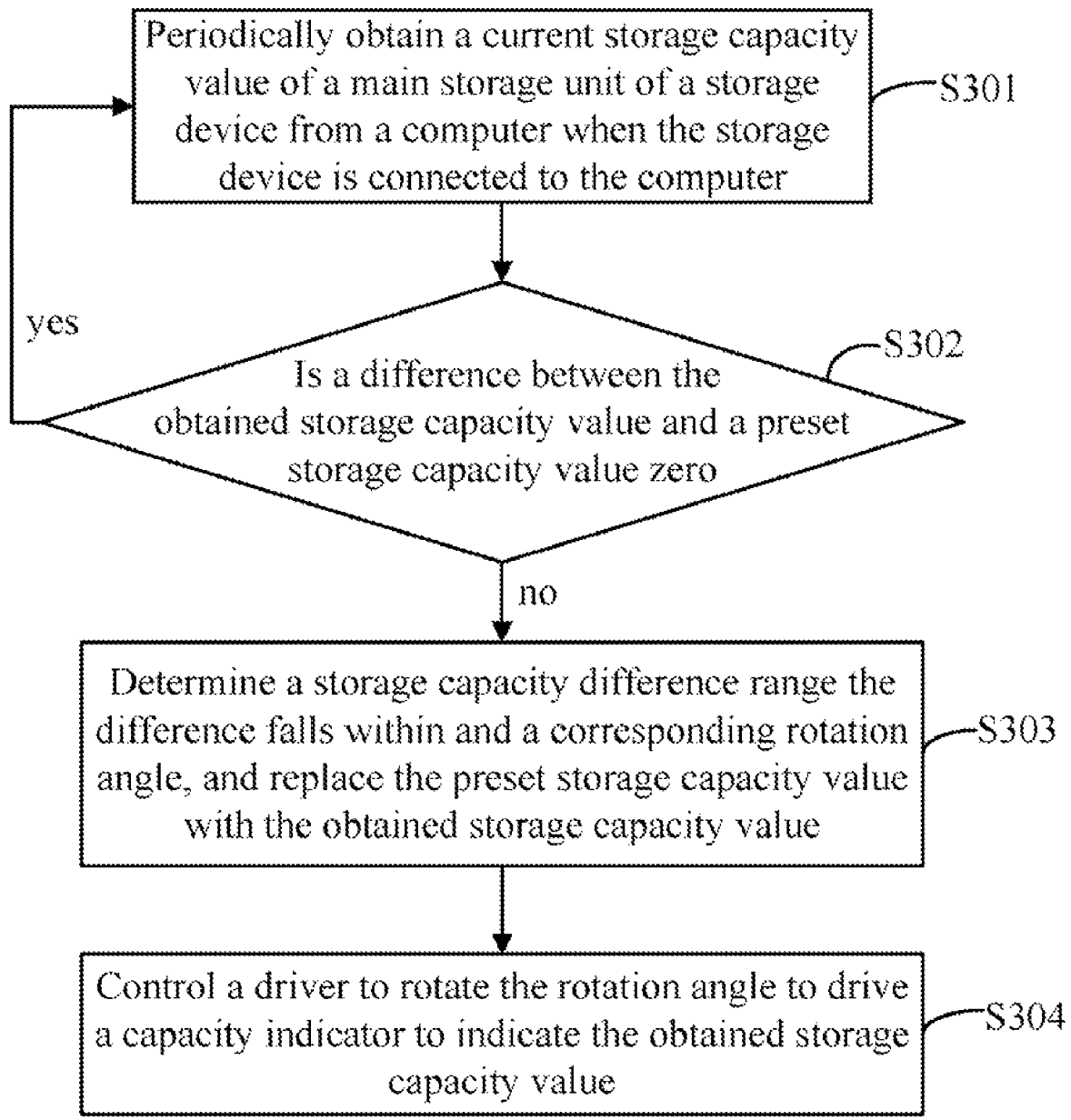
FIG. 3 is a flowchart of a method for indicating storage capacity in accordance with an exemplary embodiment.

Referring to FIG. 3, a flowchart of a method for indicating storage capacity in accordance with an exemplary embodiment is illustrated.

In step S301, the storage capacity obtaining module 62 periodically obtains a current storage capacity value of the main storage unit 10 from the computer 200 when the device 100 is connected to the computer 200. In this embodiment, the current storage capacity value is the current available storage capacity. In an alternative embodiment, the current storage capacity value is the current used available storage capacity.

In step S302, the determining module 64 determines a difference between the obtained storage capacity value and the preset storage capacity value. If the difference is zero, the procedure returns to step S301, otherwise, the procedure goes to step S303.

In step S303, the determining module 64 determines the storage capacity difference range the difference falls within and the rotation angle the determined storage capacity difference range corresponds to in the drive table, and replaces the preset storage capacity value with the obtained storage capacity value.

In step S304, the driver control module 66 controls the driver 40 to rotate the determined rotation angle clockwise or counterclockwise to drive the capacity indicator 30 to indicate the obtained storage capacity value.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A storage device comprising:
   a communication unit;
   a main storage unit;
   a capacity indicator configured to indicate a current storage capacity value of the main storage unit;
   a driver configured to drive the capacity indicator to indicate a current storage capacity value of the main storage unit;
   a secondary storage unit storing a preset storage capacity value and a drive table recording relationship between storage capacity difference ranges and rotation angles of the driver, each of the storage capacity difference range values corresponding to one of the rotation angles; and
   a processing unit configured to:
      obtain a current storage capacity value from a computer connected to the storage device through the communication unit;
      determine a difference between the obtained storage capacity value and the preset storage capacity value, determine the storage capacity difference range the difference falls within and the rotation angle the determined storage capacity difference range corresponds to in the drive table, and replace the preset storage capacity value with the obtained storage capacity value if the difference is greater than zero; and
   control the driver to rotate the determined rotation angle to drive the capacity indicator to indicate the obtained storage capacity value.

2. The storage device as described in claim 1, wherein the capacity indicator comprises a transparent glass tube, an elastic capsule, and colored liquid, the transparent glass tube and the elastic capsule cooperatively form an enclosed space to receive the colored liquid, the transparent glass tube defines a storage capacity graduation on its surface, a graduation value of the graduation aligned with the colored liquid represents the obtained storage capacity value.

3. The storage device as described in claim 2, wherein the driver comprises a motor and a cam connected to the motor, the processing unit is configured to control the motor to rotate the cam the determined rotation angle, the rotation of the cam contracts the elastic capsule to drive the colored liquid to flow to a position aligned with the graduation value representing the obtained storage capacity value.

4. The storage device as described in claim 3, wherein the processing unit is configured to control the motor to rotate the cam the determined rotation angle clockwise if the obtained storage capacity value is less than the preset storage capacity value, and configured to control the motor to rotate the cam the determined rotation angle counterclockwise if the obtained storage capacity value is greater than the preset storage capacity value.

5. The storage device as described in claim 4, wherein the obtained storage capacity value is a current available storage capacity value of the main storage unit, the graduation values of the graduation gradually increase from a top of the transparent glass tube to the elastic capsule.

6. The storage device as described in claim 3, wherein the processing unit is configured to control the motor to rotate the cam the determined rotation angle clockwise if the obtained storage capacity value is greater than the preset storage capacity value, and configured to control the motor to rotate the cam the determined rotation angle counterclockwise if the obtained storage capacity value is less than the preset storage capacity value.

7. The storage device as described in claim 6, wherein the obtained storage capacity value is a current used storage capacity value of the main storage unit, the graduation values of the graduation gradually increase from a top of the transparent glass tube to the elastic capsule.

8. The storage device as described in claim 1, wherein the capacity indicator keeps indicating the obtained storage capacity value when the storage device and the computer are disconnected.

9. A method for indicating storage capacity applied in a storage device, the storage device comprising a main storage unit, a capacity indicator, a driver, and a secondary storage unit, the second storage unit storing a preset storage capacity value and a drive table recording relationship between storage capacity difference ranges and rotation angles of the driver, each of the storage capacity difference ranges corresponding to one of the rotation angles, the method comprising:

periodically obtaining a storage capacity value from a computer connected to the storage device;

computing a difference between the obtained storage capacity value and the preset storage capacity value;

determining the storage capacity difference range the difference falls within and the rotation angle the determined storage capacity difference range corresponds to in the drive table if the difference is greater than zero; and controlling the driver to rotate the determined rotation angle to drive the capacity indicator to indicate the obtained storage capacity value.

10. The method as described in claim 9, wherein the driver comprises a motor and a cam connected to the motor, the step of controlling the driver to rotate the determined rotation angle to drive the capacity indicator to indicate the obtained storage capacity value comprises:

controlling the motor to rotate the cam the determined rotation angle clockwise if the obtained storage capacity value is less than the preset storage capacity value; and controlling the motor to rotate the cam the determined rotation angle counterclockwise if the obtained storage capacity value is greater than the preset storage capacity value.

11. The method as described in claim 9, wherein the driver comprises a motor and a cam connected to the motor, the step of controlling the driver to rotate the determined rotation angle to drive the capacity indicator to indicate the obtained storage capacity value comprises:

controlling the motor to rotate the cam the determined rotation angle clockwise if the obtained storage capacity value is greater than the preset storage capacity value; and controlling the motor to rotate the cam the determined rotation angle counterclockwise if the obtained storage capacity value is less than the preset storage capacity value.

12. The method as described in claim 9, wherein the obtained storage capacity value is a current available storage capacity of the storage device.

13. The method as described in claim 9, wherein the obtained storage capacity value is a current used storage capacity of the storage device.

* * * * *